(12) United States Patent
Watanabe et al.

(10) Patent No.: US 11,349,685 B2
(45) Date of Patent: May 31, 2022

(54) RELAY DEVICE

(71) Applicant: TOYOTA JIDOSHA KABUSHIKI KAISHA, Toyota (JP)

(72) Inventors: Isao Watanabe, Nagoya (JP); Masahide Ozaki, Anjo (JP); Nobuyuki Nakagawa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 342 days.

(21) Appl. No.: 16/575,487

(22) Filed: Sep. 19, 2019

(65) Prior Publication Data
US 2020/0177414 A1    Jun. 4, 2020

(30) Foreign Application Priority Data
Nov. 29, 2018  (JP) .............................. JP2018-223656

(51) Int. Cl.
| H04L 12/40 | (2006.01) |
| H04W 4/40  | (2018.01) |
| H04L 9/40  | (2022.01) |
| H04L 67/12 | (2022.01) |

(52) U.S. Cl.
CPC .. *H04L 12/40156* (2013.01); *H04L 12/40163* (2013.01); *H04L 63/1416* (2013.01); *H04L 67/12* (2013.01); *H04W 4/40* (2018.02); *H04L 2012/40273* (2013.01)

(58) Field of Classification Search
CPC ......... H04L 12/40156; H04L 12/40163; H04L 63/1416; H04L 67/12; H04L 2012/40273; H04W 4/40

USPC ......................................................... 370/455
See application file for complete search history.

(56) References Cited

U.S. PATENT DOCUMENTS

| 2013/0204484 | A1  | 8/2013  | Ricci |
| 2018/0004964 | A1  | 1/2018  | Litichever et al. |
| 2018/0302338 | A1* | 10/2018 | Yousefi .................. H04W 4/40 |

FOREIGN PATENT DOCUMENTS

JP      2007-038904 A      2/2007

* cited by examiner

*Primary Examiner* — Natasha W Cosme
(74) *Attorney, Agent, or Firm* — Oliff PLC (57) ABSTRACT

A relay device connected to an in-vehicle network includes a first determination unit; a second determination unit; and a relay processing unit. The first determination unit is configured to send out a high priority transfer message through a first path that runs from the first determination unit to the relay processing unit without passing through the second determination unit. The relay processing unit is configured to output the high priority transfer message, acquired through the first path, to the second determination unit and the in-vehicle device. The first determination unit is configured to send out a normal priority transfer message to the relay processing unit through a second path that runs from the first determination unit to the relay processing unit via the second determination unit. The relay processing unit is configured to output the normal priority transfer message, acquired through the second path, to the in-vehicle device.

8 Claims, 10 Drawing Sheets

<HIGH PRIORITY TRANSFER MESSAGE TABLE>

|   | PROTOCOL | IDENTIFYING ID | IDENTIFICATION VALUE |
|---|---|---|---|
| 1 | CAN | CAN_ID | 0x100 |
| 2 | Ethernet | ID ADDRESS | 192.168.2.* |
| 3 | Ethernet | VLAN_ID | 0x1 |
| 4 | ... | ... | ... |

RELAY DEVICE

INCORPORATION BY REFERENCE

The disclosure of Japanese Patent Application No. 2018-223656 filed on Nov. 29, 2018 including the specification, drawings and abstract is incorporated herein by reference in its entirety.

BACKGROUND

1. Technical Field

The disclosure relates to a relay device connected to an in-vehicle network.

2. Description of Related Art

Japanese Unexamined Patent Application Publication No. 2007-038904 (JP 2007-038904 A) describes a gateway ECU that relays messages between in-vehicle networks (CAN bus 1 and CAN bus 2). The gateway ECU described in JP 2007-038904 A checks an incoming message for normality and relays only a message whose normality has been determined. Thus, the gateway ECU holds down an increase in the load on the in-vehicle networks.

SUMMARY

However, it takes time to check a message for normality, as described in JP 2007-038904 A. Therefore, for a high priority transfer message that needs to be relayed in minimum delay time, there is room for improvement in a relay processing method.

The disclosure provides a relay device that is able to reduce a time to relay a high priority transfer message while ensuring message communication security.

An aspect of the disclosure relates to a relay device connected to an in-vehicle network. The relay device includes a first determination unit configured to receive a message from an external device, determine whether the received message is a high priority transfer message containing data that needs to be sent within a predetermined time to an in-vehicle device connected to the in-vehicle network, and send out the received message through a predetermined path based on the determined result; a second determination unit configured to determine whether an acquired message is an unauthorized message due to an unauthorized intrusion; and a relay processing unit configured to relay the acquired message to at least the in-vehicle device. The first determination unit is configured to, when the first determination unit determines that the received message is the high priority transfer message, send out the high priority transfer message through a first path that runs from the first determination unit to the relay processing unit without passing through the second determination unit. The relay processing unit is configured to output the high priority transfer message, acquired through the first path, to the second determination unit and the in-vehicle device. The first determination unit is configured to, when the first determination unit determines that the received message is a normal priority transfer message different from the high priority transfer message, send out the normal priority transfer message to the relay processing unit through a second path that runs from the first determination unit to the relay processing unit via the second determination unit. The relay processing unit is configured to output the normal priority transfer message, acquired through the second path, to the in-vehicle device.

With the relay device of the above aspect, a time to relay a high priority transfer message is reduced while message communication security is ensured.

In the above aspect, the relay device may further include a saving unit and a third determination unit. The saving unit may be provided in the second path and configured to temporarily save the normal priority transfer message. The third determination unit may be provided in the second path, and configured to acquire the normal priority transfer message and determine whether the acquired normal priority transfer message is an authorized message that satisfies a predetermined condition. The saving unit may be configured to save the normal priority transfer message output to the second path. The third determination unit may be configured to read the normal priority transfer message from the saving unit at predetermining timing. The third determination unit may be configured to, when the read normal priority transfer message is the authorized message, output the normal priority transfer message to the second determination unit.

In the above aspect, the third determination unit may be configured to, when the second determination unit determines that the normal priority transfer message output to the second path is the unauthorized message, discard the normal priority transfer message.

In the above aspect, the relay processing unit may be configured to, when the second determination unit determines that the high priority transfer message output to the first path is the unauthorized message, discard a response message that is received from the in-vehicle device as a response to the high priority transfer message.

In the above aspect, the second determination unit may be configured to, when the second determination unit determines that at least one of the high priority transfer message and the normal priority transfer message is the unauthorized message, provide the first determination unit with notification that the at least one of the high priority transfer message and the normal priority transfer message is the unauthorized message.

In the above aspect, the relay device may further include a fourth determination unit. The fourth unit may be configured to determine whether a message received by the relay processing unit from the in-vehicle device is the high priority transfer message. When the fourth determination unit determines that the message received by the relay processing unit from the in-vehicle device is the high priority transfer message, the relay processing unit may be configured to duplicate the high priority transfer message and output the high priority transfer messages respectively to the second determination unit and the in-vehicle device, and when the fourth determination unit may determine that the message received by the relay processing unit from the in-vehicle device is the normal priority transfer message, the second determination unit may be configured to acquire the normal priority transfer message. The second determination unit may be configured to, when the acquired normal priority transfer message is not the unauthorized message, output the normal priority transfer message to the relay processing unit; and the relay processing unit may be configured to output the normal priority transfer message, acquired from the second determination unit, to an intended in-vehicle device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiment

A relay device of an embodiment of the disclosure has a component to check whether an authorized message received by a firewall is a high priority transfer message and a component to duplicate a high priority transfer message. When the authorized message is a high priority transfer message, the relay device duplicates the high priority transfer message, and relays one of the high priority transfer messages to an in-vehicle network and uses the other one to determine whether there is an unauthorized intrusion at the same time. When the authorized message is a normal priority transfer message, the relay device initially determines whether there is an unauthorized intrusion and then, when there is no unauthorized intrusion, relays the normal priority transfer message to the in-vehicle network. Thus, a time to relay a high priority transfer message is reduced while message communication security is ensured.

Configuration

Figure 1:
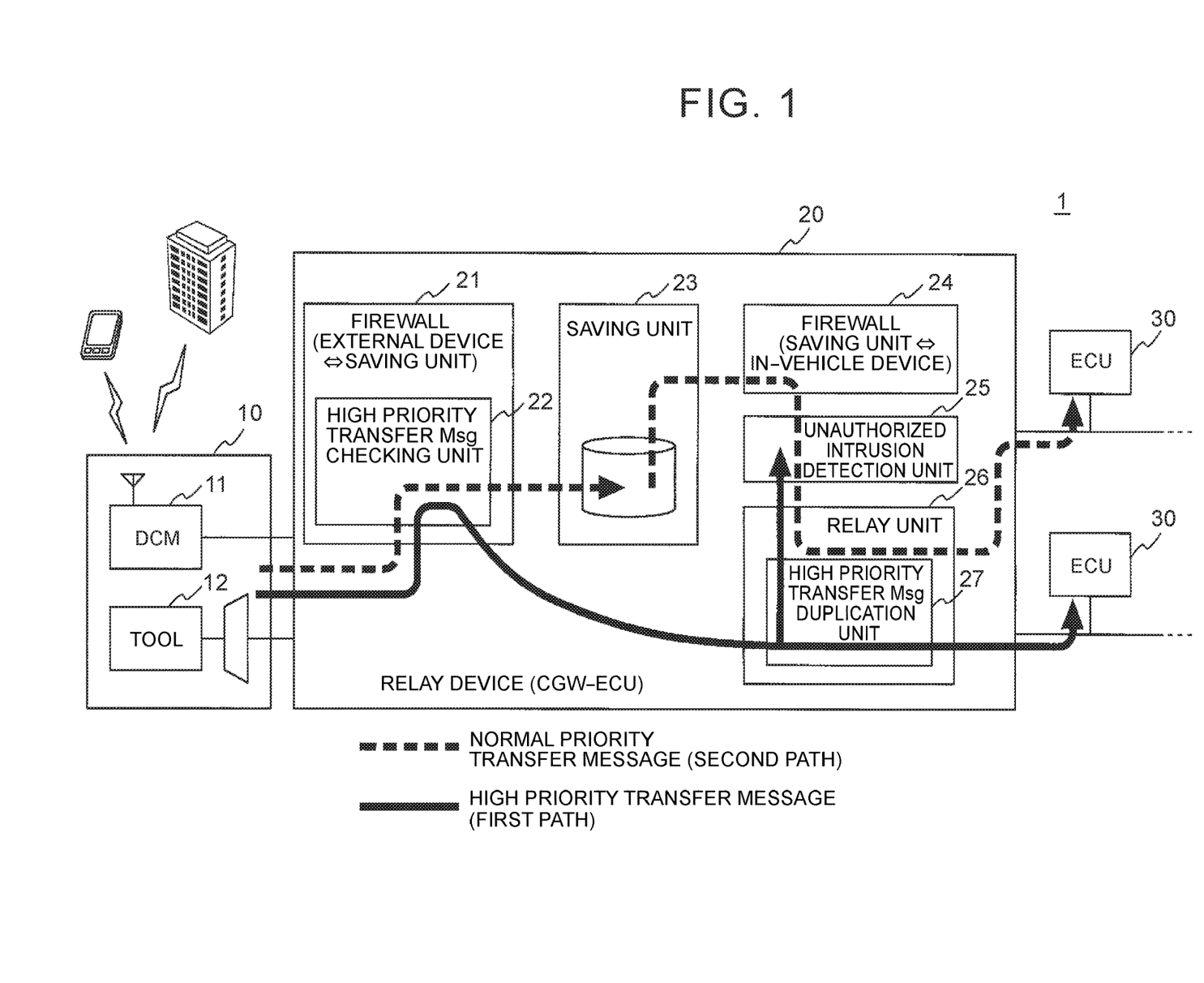
FIG. 1 is a diagram that shows a schematic configuration example of an in-vehicle communication system to which a relay device according to an embodiment is applied.

FIG. 1 is a diagram that shows the schematic configuration of an in-vehicle communication system 1 to which a relay device 20 according to one embodiment of the disclosure is applied. The in-vehicle communication system 1 illustrated in FIG. 1 includes the relay device 20, an input-output device 10, and a plurality of ECUs 30. The input-output device 10 is communicably connected to the relay device 20 by wired connection or others. The ECUs 30 are communicably connected to the relay device 20 via an in-vehicle network.

Examples of the input-output device 10 include a data communication module (DCM) 11 and a service tool 12. The DCM 11 is connected to an external device, such as an information management center and a mobile device such as a smartphone, by wireless communication (4G, Wi-Fi, or the like). The service tool 12 performs a vehicle diagnosis, or the like. The data communication module 11 connected to the external device, and the service tool 12 send a request to collect or manipulate various pieces of information to the ECUs 30.

The relay device 20 relays messages for communication between the external device and each of the ECUs 30 that are in-vehicle devices, or relays messages for communication between the ECUs 30. The relay device 20 is, for example, a central gateway (CGW) ECU. The relay device 20 includes a firewall 21, a high priority transfer message (high priority transfer Msg) checking unit 22, a saving unit 23, a firewall 24, an unauthorized intrusion detection unit 25, a relay unit 26, and a high priority transfer message (high priority transfer Msg) duplication unit 27. The firewall 21 and the high priority transfer message checking unit 22 may be regarded as a first determination unit. The firewall 24 may be regarded as a third determination unit. The unauthorized intrusion detection unit 25 may be regarded as a second determination unit. The relay unit 26 and the high priority transfer message duplication unit 27 may be regarded as a relay processing unit.

The firewall 21 is connected to the external device, monitors a message that the relay device 20 receives from the input-output device 10, and determines whether the received message is an authorized message based on a predetermined first condition. The firewall 21 checks the header information of a message and determines whether the message is an authorized message intended for the relay device 20. The first condition may be, for example, information on the address of the relay device 20. When the firewall 21 determines that the message received from the input-output device 10 is an authorized message, the firewall 21 requests to the high priority transfer message checking unit 22 to determine whether the authorized message is a high priority transfer message. The firewall 21 sends out the received message through a predetermined path based on the determined result of the high priority transfer message checking unit 22. Specifically, the firewall 21 outputs the message to the high priority transfer message duplication unit 27 (first path) when the authorized message is a high priority transfer message, and outputs the message to the saving unit 23 (second path) when the authorized message is a normal priority transfer message.

When only an authorized message intended for the relay device 20 is output from the service tool 12 and there is no possibility that the relay device 20 receives an unauthorized message, the firewall 21 may be provided in the data communication module 11.

The high priority transfer message checking unit 22 receives the request from the firewall 21 and determines whether the authorized message is a high priority transfer message containing data that needs to be sent within a predetermined time to an intended one of the ECUs 30 or a normal priority transfer message different from the high priority transfer message. Examples of the data that needs to be sent within a predetermined time to an intended one of the ECUs 30 include data for which a communication response delay time (a time that is allowed from a communication request to receipt of a response) is stipulated in the on-board diagnostics (OBD) regulations or others. The predetermined time may be set based on a communication response delay time, a processing time of an intended one of the ECUs 30, or the like. From the viewpoint of security, of high priority transfer messages to which a communication response delay time should be considered in accordance with the OBD regulations or others, it is desirable that high priority transfer messages concerned with functions that do not influence the safety of a vehicle even when a message is abused be targeted.

The high priority transfer message checking unit 22 is able to determine whether the message determined by the firewall 21 as an authorized message is a high priority transfer message or a normal priority transfer message by consulting, for example, a table that describes information for determining a message as a high priority transfer message (hereinafter, referred to as high priority transfer message table). The high priority transfer message table will be described later. The high priority transfer message checking unit 22 sends back the determined result on the authorized message to the firewall 21. FIG. 1 illustrates an example in which the high priority transfer message checking unit 22 is provided in the firewall 21. Alternatively, the high priority transfer message checking unit 22 may be provided outside the firewall 21.

The saving unit 23 is provided downstream of the firewall 21 (second path). Of messages determined as authorized messages by the firewall 21, the saving unit 23 temporarily saves only messages determined as normal priority transfer messages in the high priority transfer message checking unit 22. The saving unit 23 functions as a demilitarized zone (DMZ).

The firewall 24 is provided downstream of the saving unit 23 (second path). The firewall 24 reads at predetermined timing a normal priority transfer message saved in the saving unit 23 and determines whether the normal priority transfer message is an authorized message based on a predetermined third condition. The firewall 24 checks the details of data contained in a message and determines whether the data is authorized and necessary for an intended one of the ECUs 30. The third condition may be, for example, information for verifying a digital signature attached to data. The timing to read a message saved in the saving unit 23 may be the timing just after the message is saved in the saving unit 23 or may be the timing when there occurs a request from the relay unit 26 or any one of the ECUs 30.

The unauthorized intrusion detection unit 25 acquires a high priority transfer message from the relay unit 26 or acquires a normal priority transfer message from the firewall 24, and determines whether the acquired message is an unauthorized message due to an unauthorized intrusion into the relay device 20 based on a predetermined second condition. The unauthorized intrusion detection unit 25 determines that the received message is an unauthorized message when the unauthorized intrusion detection unit 25 detects that the message received by the relay device 20 deviates from a predetermined message rule. Examples of the second condition may include the fact that a message that is supposed to be received at constant intervals is received at timing earlier (later) than the interval, the fact that a message that is supposed to be sent in fixed order is received in a different turn, and the fact that a message whose deviation in correlation from a plurality of messages is large is detected. A log of detected unauthorized messages is saved.

The high priority transfer message duplication unit 27 acquires a high priority transfer message from the firewall 21 and duplicates the high priority transfer message. FIG. 1 illustrates an example in which the high priority transfer message duplication unit 27 is provided in the relay unit 26. Alternatively, the high priority transfer message duplication unit 27 may be provided outside the relay unit 26.

The high priority transfer message duplication unit 27, as well as the high priority transfer message checking unit 22, may hold a high priority transfer message table that describes information for determining a message as a high priority transfer message. In this case, the high priority transfer message duplication unit 27 also has the same table as the table that the high priority transfer message checking unit 22 has. Thus, for example, even when there is unauthorized access to the firewall 21 and the high priority transfer message table that the high priority transfer message checking unit 22 holds is manipulated, whether a message determined by the firewall 21 as an authorized message is a high priority transfer message or a normal priority transfer message is determined by using the high priority transfer message table that the high priority transfer message duplication unit 27 holds.

The relay unit 26 relays a message by sending high priority transfer messages duplicated by the high priority transfer message duplication unit 27 respectively to an intended one of the ECUs 30 and the unauthorized intrusion detection unit 25 in parallel, sending a normal priority transfer message that is acquired from the unauthorized intrusion detection unit 25 to an intended one of the ECUs 30, or sending an (high priority transfer or normal priority transfer) message that is received from any one of the ECUs 30 to another one of the ECUs 30 of the in-vehicle network or to an external device via the input-output device 10.

The electronic control units (ECUs) 30 are electronic control units that control various actuators mounted on the vehicle. The ECUs 30 are able to operate a plurality of actuators in coordination with each other by using communication via the in-vehicle network.

Control

Figure 2:
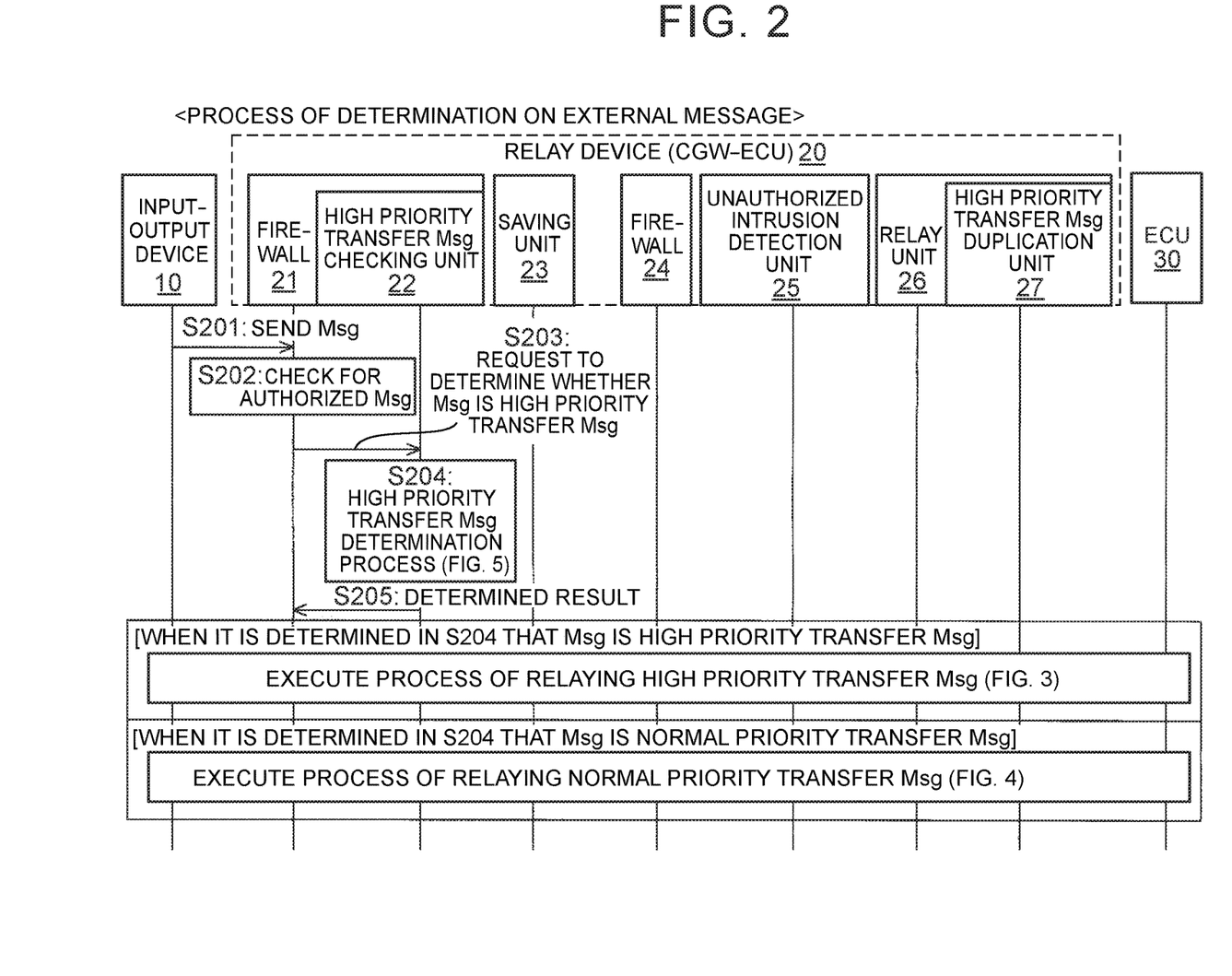
FIG. 2 is a process sequence in which the relay device carries out a determination on an external message that is received from an input-output device.
Figure 3:
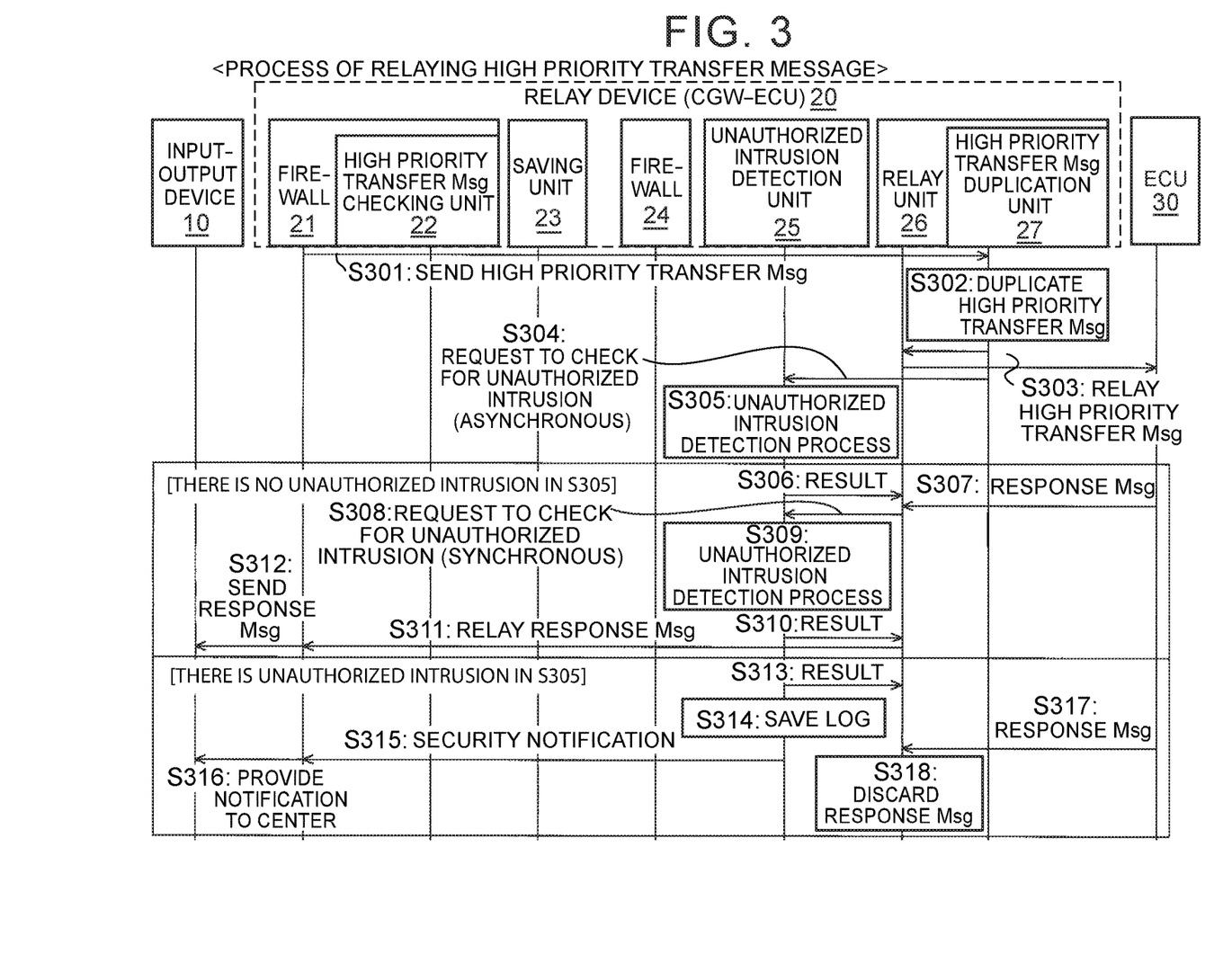
FIG. 3 is a process sequence in which the relay device relays a high priority transfer message to an ECU.
Figure 4:
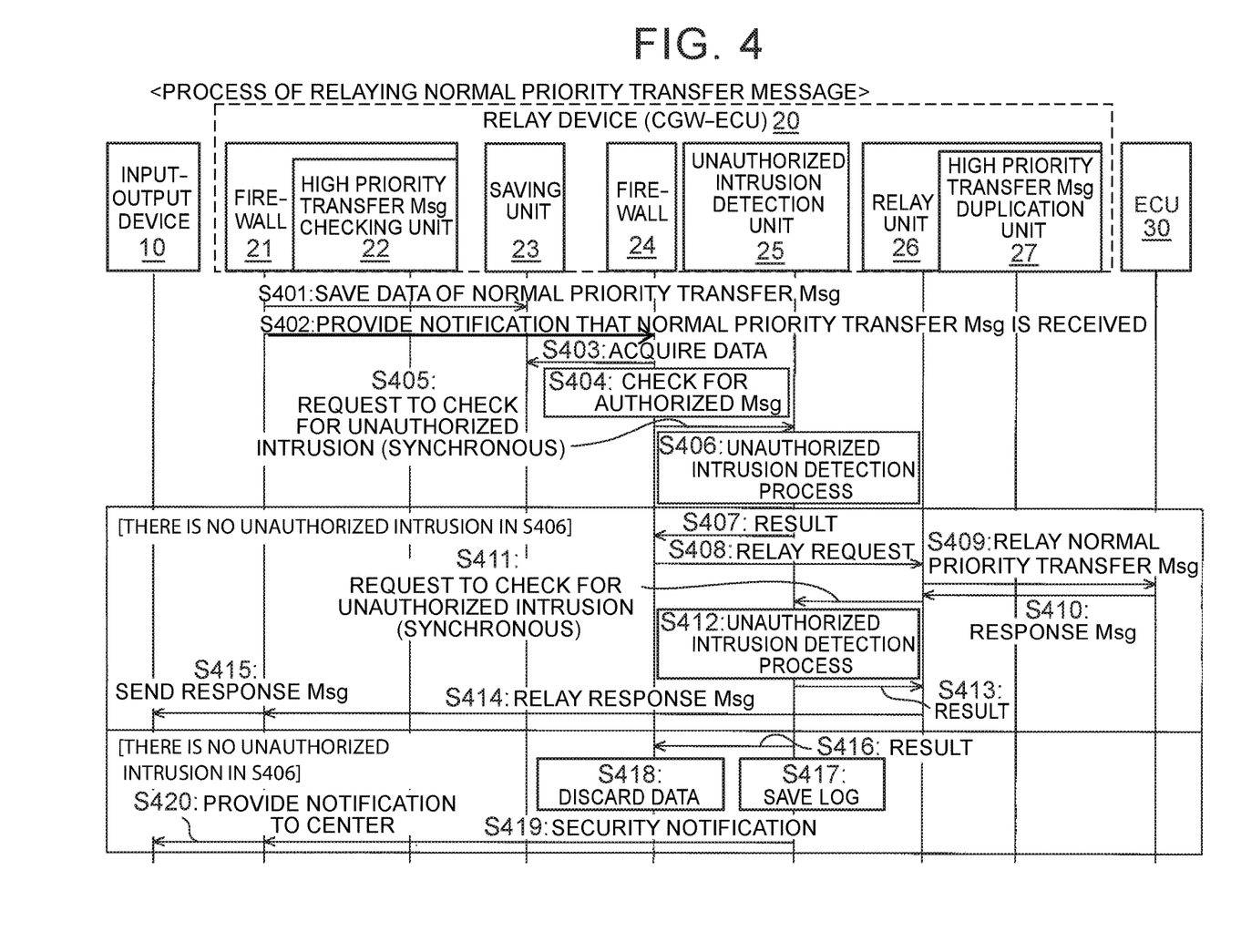
FIG. 4 is a process sequence in which the relay device relays a normal priority transfer message to an ECU.
Figure 5:
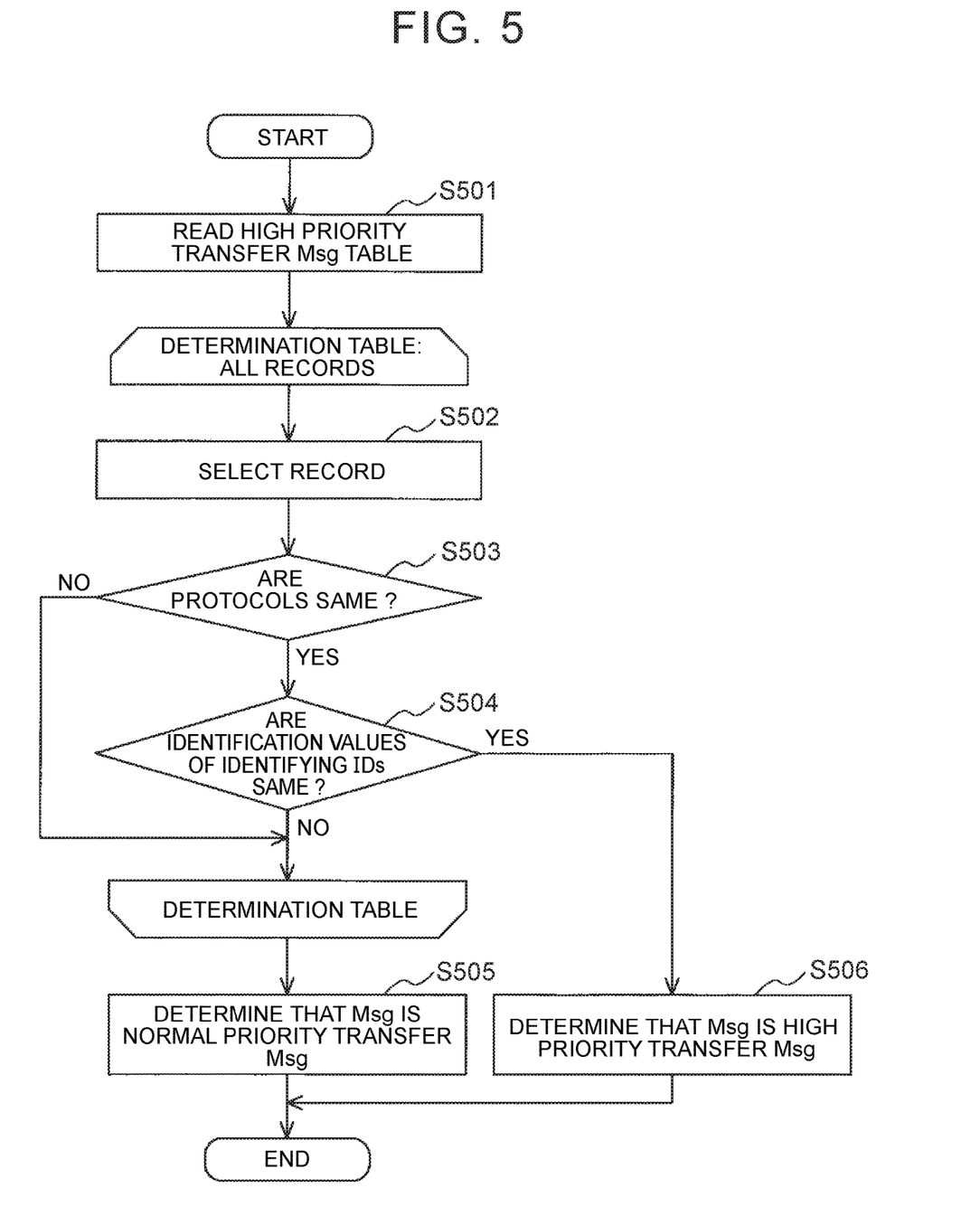
FIG. 5 is a flowchart of a high priority transfer message determination process for an external message, which the relay device executes.
Figure 6:
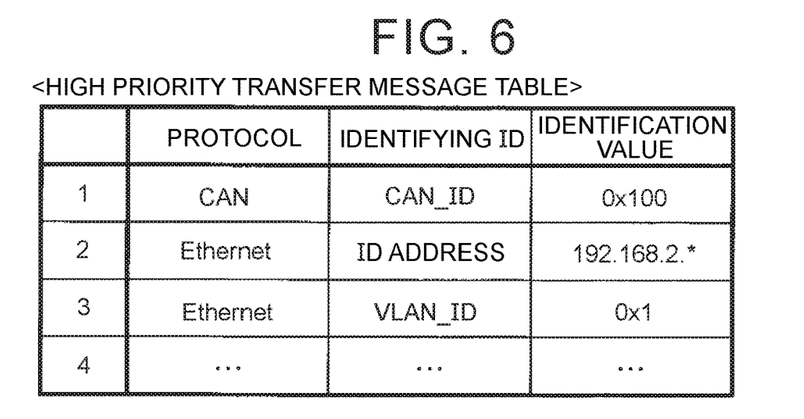
FIG. 6 is an example of a high priority transfer message table.
Figure 7:
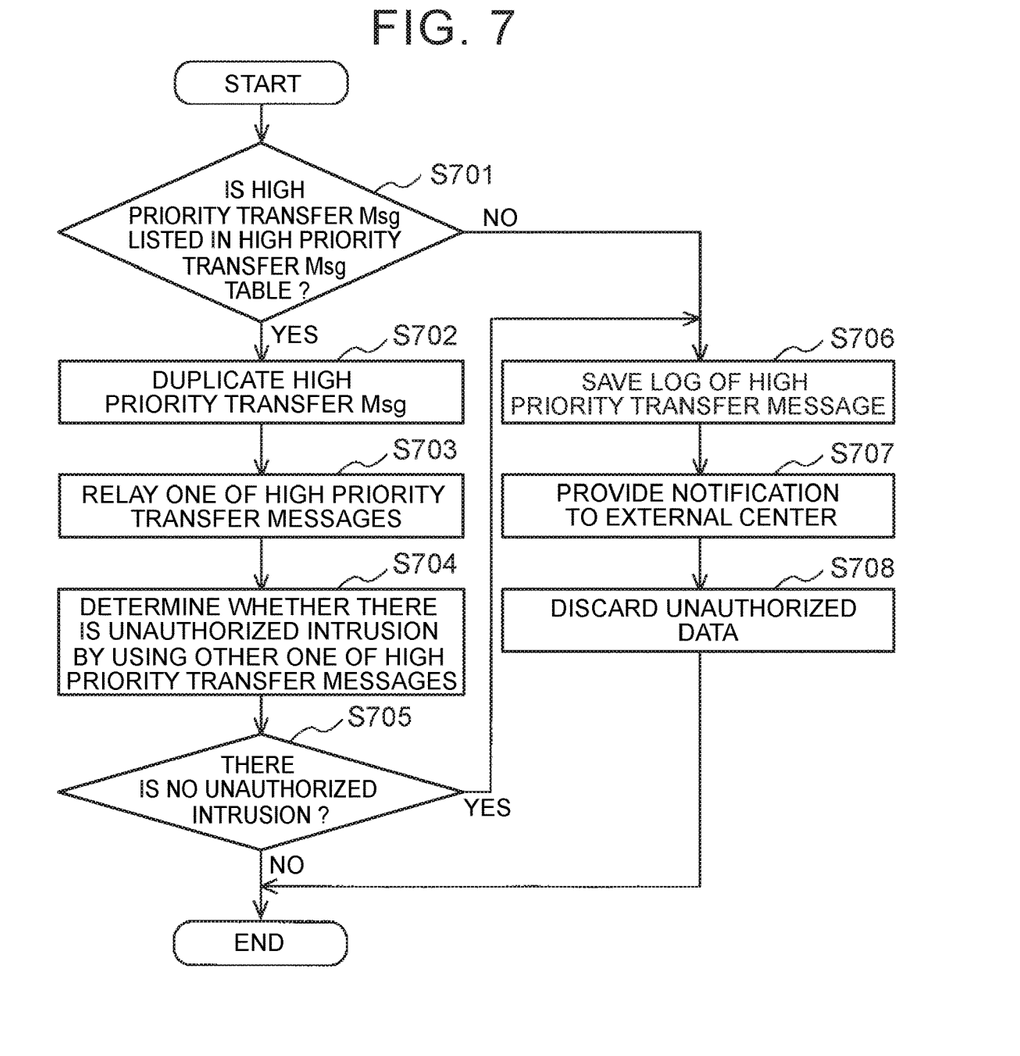
FIG. 7 is a flowchart of a process in which the relay device relays a high priority transfer message.

Next, control that the relay device 20 according to the present embodiment executes will be described in order with further reference to FIG. 2 to FIG. 7. FIG. 2 is a process sequence in which the relay device 20 carries out a determination on an external message that is received from the input-output device 10. FIG. 3 is a process sequence in which the relay device 20 relays a high priority transfer message to an intended one of the ECUs 30. FIG. 4 is a process sequence in which the relay device 20 relays a normal priority transfer message to an intended one of the ECUs 30. FIG. 5 is a flowchart of a high priority transfer message determination process for an external message, which the relay device 20 executes. FIG. 6 is an example of the high priority transfer message table. FIG. 7 is a flowchart of a process in which the relay device 20 relays a high priority transfer message.

(1) Process of Determination on External Message

The process of determination on an external message that is communicated between an external device and one of the ECUs 30 will be described with reference to FIG. 2. The process sequence shown in FIG. 2 is started when the relay device 20 receives a message from the input-output device 10.

In step S201, the input-output device 10 sends a message (Msg) received from an external device to the firewall 21. In step S202, the firewall 21 determines that the message sent from the input-output device 10 is an authorized message (authorized Msg). When the message is not an authorized message, the sequence ends. In step S203, the firewall 21 requests to the high priority transfer message checking unit 22 to determine whether the authorized message is a high priority transfer message (high priority transfer Msg). In step S204, the high priority transfer message checking unit 22 executes the high priority transfer message determination process (FIG. 5) in response to the request from the firewall 21. In step S205, the high priority transfer message checking unit 22 sends back the result of the high priority transfer message determination process (FIG. 5) to the firewall 21.

When the high priority transfer message checking unit 22 determines that the authorized message is a high priority transfer message based on the determined result received by the firewall 21, the relay device 20 executes a process of relaying the high priority transfer message (FIG. 3). When the high priority transfer message checking unit 22 determines that the authorized message is a normal priority transfer message, the relay device 20 executes a process of relaying the normal priority transfer message (FIG. 4).

(2) Process of Relaying High Priority Transfer Message

A relay process using the first path for a high priority transfer message determined by the high priority transfer message checking unit 22 will be described with reference to FIG. 3.

In step S301, the firewall 21 sends a high priority transfer message (high priority transfer Msg) to the high priority transfer message duplication unit 27. In step S302, the high priority transfer message duplication unit 27 duplicates the high priority transfer message acquired from the firewall 21. In step S303, the high priority transfer message duplication unit 27 sends one of the duplicated high priority transfer messages to the relay unit 26. The relay unit 26 sends the high priority transfer message acquired from the high priority transfer message duplication unit 27 to an intended one of the ECUs 30. In step S304, the high priority transfer message duplication unit 27 sends the other one of the duplicated high priority transfer messages to the unauthorized intrusion detection unit 25 and requests to check for an unauthorized intrusion. This request is made independently (asynchronously) of relay communication through the process of step S303. In step S305, the unauthorized intrusion detection unit 25 acquires the high priority transfer message based on the request from the high priority transfer message duplication unit 27 and detects an unauthorized intrusion by determining whether the acquired high priority transfer message is an unauthorized message.

With the processes of step S301 to step S305, a high priority transfer message is duplicated and the process of relaying the high priority transfer message to an intended one of the ECUs 30 and the process of detecting an unauthorized intrusion by using the high priority transfer message are executed in parallel with each other. Therefore, an increase in a delay time to relay a high priority transfer message is prevented.

In step S306, when the unauthorized intrusion detection unit 25 determines that the high priority transfer message is not an unauthorized message, the unauthorized intrusion detection unit 25 sends the detected result that there is no unauthorized intrusion to the relay unit 26. In step S307, the relay unit 26 receives a response message (response Msg) for the high priority transfer message from the intended one of the ECUs 30. In step S308, the relay unit 26 requests to the unauthorized intrusion detection unit 25 to check for an unauthorized intrusion by using the response message received from the ECU 30. This request is made in response to the process of step S307 (synchronously). In step S309, the unauthorized intrusion detection unit 25 detects an unauthorized intrusion by determining whether the response message is an unauthorized message based on the request from the relay unit 26. In step S310, because the response message is not an unauthorized message, the unauthorized intrusion detection unit 25 sends the detected result that there is no unauthorized intrusion to the relay unit 26. When the response message is an unauthorized message, the processes in step S313 and following steps (described later) are executed. In step S311, the relay unit 26 relays the response message received from the ECU 30 to the firewall 21. In step S312, the firewall 21 sends the response message acquired from the relay unit 26 to the input-output device 10.

With the processes of step S306 to step S312, when a high priority transfer message relayed to the in-vehicle network is not an unauthorized message, a response message for the high priority transfer message for which execution of the relay process has a higher priority is output to the input-output device 10 in a short delay time.

In step S313, when the unauthorized intrusion detection unit 25 determines that the high priority transfer message is an unauthorized message, the unauthorized intrusion detection unit 25 sends the detected result that there is an unauthorized intrusion to the relay unit 26.

In step S314, the unauthorized intrusion detection unit 25 saves a log of the fact that the unauthorized message is relayed to the in-vehicle network. In step S315, the unauthorized intrusion detection unit 25 provides the firewall 21 with information on the high priority transfer message to enhance security against unauthorized messages. The firewall 21 may be configured not to receive, for example, the corresponding high priority transfer message permanently or for a certain period of time upon receiving the information from the unauthorized intrusion detection unit 25. In step S316, the firewall 21 sends information on the high priority transfer message to the input-output device 10 to provide the information on the unauthorized message to the external device such as the information management center. In step S317, the relay unit 26 receives the response message for the high priority transfer message from the ECU 30. In step S318, the relay unit 26 discards the response message received from the ECU 30 according to the result from the unauthorized intrusion detection unit 25. As a method for handling such a response message, other than discarding the response message, relaying the response message may be stopped.

With the processes of step S313 to step S318, when it is found that a high priority transfer message relayed to the in-vehicle network is an unauthorized message, spreading of damage is prevented by preventing an intrusion of a new unauthorized message into the firewall 21 or discarding a response message generated from the unauthorized message.

(3) Process of Relaying Normal Priority Transfer Message

A relay process using the second path for a normal priority transfer message determined by the high priority transfer message checking unit 22 will be described with reference to FIG. 4.

In step S401, the firewall 21 saves data of a normal priority transfer message (normal priority transfer Msg) in the saving unit 23. In step S402, the firewall 21 provides the firewall 24 with notification that the normal priority transfer message is saved. In step S403, the firewall 24 reads and acquires the data of the normal priority transfer message saved in the saving unit 23 upon receiving the notification from the firewall 21. In step S404, the firewall 24 determines that the normal priority transfer message is an authorized message (authorized Msg) based on the data. When the normal priority transfer message is not an authorized message, the sequence ends. In step S405, the firewall 24 sends the normal priority transfer message to the unauthorized intrusion detection unit 25 and requests to check for an unauthorized intrusion. This request is made in response to the process of step S404 (synchronously). In step S406, the unauthorized intrusion detection unit 25 acquires the normal priority transfer message based on the request from the firewall 24 and detects an unauthorized intrusion by determining whether the acquired normal priority transfer message is an unauthorized message.

With the processes of step S401 to step S406, checking a normal priority transfer message for an unauthorized intrusion is performed before relaying the normal priority transfer message to the in-vehicle network, so security has a higher priority.

In step S407, when the unauthorized intrusion detection unit 25 determines that the normal priority transfer message is not an unauthorized message, the unauthorized intrusion detection unit 25 sends the detected result that there is no unauthorized intrusion to the firewall 24. In step S408, the firewall 24 sends the normal priority transfer message to the relay unit 26 and requests to relay the normal priority transfer message. In step S409, the relay unit 26 sends the normal priority transfer message acquired from the firewall 24 to an intended one of the ECUs 30. In step S410, the relay unit 26 receives a response message (response Msg) for the normal priority transfer message from the ECU 30. In step S411, the relay unit 26 sends the response message received from the ECU 30 to the unauthorized intrusion detection unit 25 and requests to check for an unauthorized intrusion. This request is made in response to the process of step S410 (synchronously). In step S412, the unauthorized intrusion detection unit 25 acquires the response message based on the request from the relay unit 26 and detects an unauthorized intrusion by determining whether the acquired response message is an unauthorized message. In step S413, because the response message is not an unauthorized message, the unauthorized intrusion detection unit 25 sends the detected result that there is no unauthorized intrusion to the relay unit 26. When the unauthorized intrusion detection unit 25 determines that the response message is an unauthorized message, the process of step S318 is executed. In step S414, the relay unit 26 relays the response message received from the ECU 30 to the firewall 21. In step S415, the firewall 21 sends the response message acquired from the relay unit 26 to the input-output device 10.

With the processes of step S407 to step S415, the relay device 20 verifies that a received normal priority transfer message is not an unauthorized message and then relays the normal priority transfer message to an intended one of the ECUs 30, so security increases.

In step S416, when the unauthorized intrusion detection unit 25 determines that the normal priority transfer message is an unauthorized message, the unauthorized intrusion detection unit 25 sends the detected result that there is an unauthorized intrusion to the firewall 24. In step S417, the unauthorized intrusion detection unit 25 saves a log of the fact that the unauthorized message has been received by the relay device 20. In step S418, the firewall 24 discards data of the normal priority transfer message read and acquired from the saving unit 23 according to the result from the unauthorized intrusion detection unit 25. In step S419, the unauthorized intrusion detection unit 25 provides the firewall 21 with information on the normal priority transfer message to enhance security against unauthorized messages. The firewall 21 may be configured not to receive, for example, the corresponding normal priority transfer message permanently or for a certain period of time upon receiving the information from the unauthorized intrusion detection unit 25. In step S420, the firewall 21 sends information on the normal priority transfer message to the input-output device 10 to provide the information on the unauthorized message to the external device such as the information management center.

With the processes of step S416 to step S420, when it is found that a normal priority transfer message received by the relay device 20 is an unauthorized message, spreading of damage is prevented by preventing an intrusion of a new unauthorized message into the firewall 21 or discarding data of the unauthorized message.

(4) Process of Determining on High Priority Transfer Message

A determination process on a high priority transfer message, which the high priority transfer message checking unit 22 executes, will be described with reference to FIG. 5 and FIG. 6. The process flowchart shown in FIG. 5 is started when the high priority transfer message checking unit 22 receives from the firewall 21 a request to determine whether an authorized message is a high priority transfer message.

In step S501, the high priority transfer message checking unit 22 reads the high priority transfer message table (high priority transfer Msg table). When the high priority transfer message table is read, the process proceeds to step S502.

FIG. 6 shows an example of the high priority transfer message table. In the example of FIG. 6, as information to determine whether an authorized message is a high priority transfer message, a plurality of records each containing a set of pieces of information, that is, a protocol, identifying ID, and an identification value that are used for a message, is listed. Like the second record and the third record, a plurality of identifying IDs may be designated with the same protocol. When records to be listed are limited to necessary minimum, such as messages containing data whose communication response delay time is stipulated in the OBD regulations, the size of a memory that stores the high priority transfer message table can be reduced. For example, when an exclusive ID that represents a high priority transfer message is defined in advance and a rule to store the exclusive ID in a predetermined field of a message at the time when the external device, any one of the ECUs 30, or the like, sends a high priority transfer message is made, the exclusive ID just needs to be entered into the high priority transfer message table. With such a high priority transfer message table, a high priority transfer message is determined without depending on a protocol. It is desirable that the high priority transfer message table be saved in a secured area that cannot be manipulated.

In step S502, the high priority transfer message checking unit 22 selects one record from among a plurality of records listed in the high priority transfer message table. When a record is selected, the process proceeds to step S503.

In step S503, the high priority transfer message checking unit 22 determines whether the protocol of the authorized message is the same as the protocol of the selected record. When both the protocols are the same (YES in S503), the process proceeds to step S504. When both the protocols are not the same (NO in S503), the process proceeds to step S502.

In step S504, the high priority transfer message checking unit 22 determines whether the identifying ID and identification value of the authorized message are the same as the identifying ID and identification value of the selected record. When the identifying IDs and identification values of both are the same (YES in S504), the process proceeds to step S506. When the identifying IDs and identification values of both are not the same (NO in S503), the process proceeds to step S502.

The processes of step S502 to step S504 are executed in predetermined order over the plurality of records listed in the high priority transfer message table, and end at the time when a record of the same information as the authorized message is found. As a result of executing the processes over all the records listed in the high priority transfer message table, when there is no record of the same information as the authorized message, the process proceeds to step S505.

In step S505, the high priority transfer message checking unit 22 determines that the authorized message is a normal priority transfer message, and ends the process.

In step S506, the high priority transfer message checking unit 22 determines that the authorized message is a high priority transfer message, and ends the process.

(5) Process of Duplicating High Priority Transfer Message

A process of duplicating a high priority transfer message, which the firewall 24, the unauthorized intrusion detection unit 25, the relay unit 26, and the high priority transfer message duplication unit 27 execute, will be described with reference to FIG. 7. The process flowchart shown in FIG. 7 is started when the high priority transfer message duplication unit 27 receives a high priority transfer message from the firewall 21.

In step S701, the high priority transfer message duplication unit 27 determines whether a high priority transfer message (high priority transfer Msg) acquired from the firewall 21 is listed in the high priority transfer message table (high priority transfer Msg table). This determination makes it possible to correctly determine whether a message determined by the firewall 21 as an authorized message is a high priority transfer message even when the high priority transfer message table of the high priority transfer message checking unit 22 is manipulated as described above. The determination is carried out based on the processes of step S501 to step S506 of FIG. 5. When the authorized message is listed in the high priority transfer message table (YES in S701), the process proceeds to step S702. When the authorized message is not listed in the high priority transfer message table (NO in S701), the process proceeds to step S706.

In step S702, the high priority transfer message duplication unit 27 duplicates the high priority transfer message. When the duplication is complete, the process proceeds to step S703.

In step S703, the relay unit 26 relays any one of the high priority transfer message acquired from the firewall 21 and the high priority transfer message duplicated by the high priority transfer message duplication unit 27 to an intended one of the ECUs 30 via the in-vehicle network. When the relaying of the high priority transfer message is complete, the process proceeds to step S704.

In step S704, the unauthorized intrusion detection unit 25 executes a process of determining whether there is an unauthorized intrusion by using the other one of the high priority transfer message acquired from the firewall 21 and the high priority transfer message duplicated by the high priority transfer message duplication unit 27. Specifically, a process of determining whether the high priority transfer message is an unauthorized message is executed. When the process of determining whether there is an unauthorized intrusion is complete, the process proceeds to step S705.

In step S705, the unauthorized intrusion detection unit 25 determines whether there is an unauthorized intrusion depending on whether the high priority transfer message is an unauthorized message. When there is an unauthorized intrusion (YES in S705), the process proceeds to step S706. When there is no unauthorized intrusion (NO in S705), the process ends.

In step S706, the unauthorized intrusion detection unit 25 saves a log of the fact that the unauthorized message has been relayed to the in-vehicle network.

In step S707, the unauthorized intrusion detection unit 25 provides the external device such as the information management center with information on the high priority transfer message to enhance security against unauthorized messages.

In step S708, the firewall 24 discards the normal priority transfer message read and acquired from the saving unit 23 according to the result from the unauthorized intrusion detection unit 25. Thus, the process ends.

Application Example 1

Figure 8:
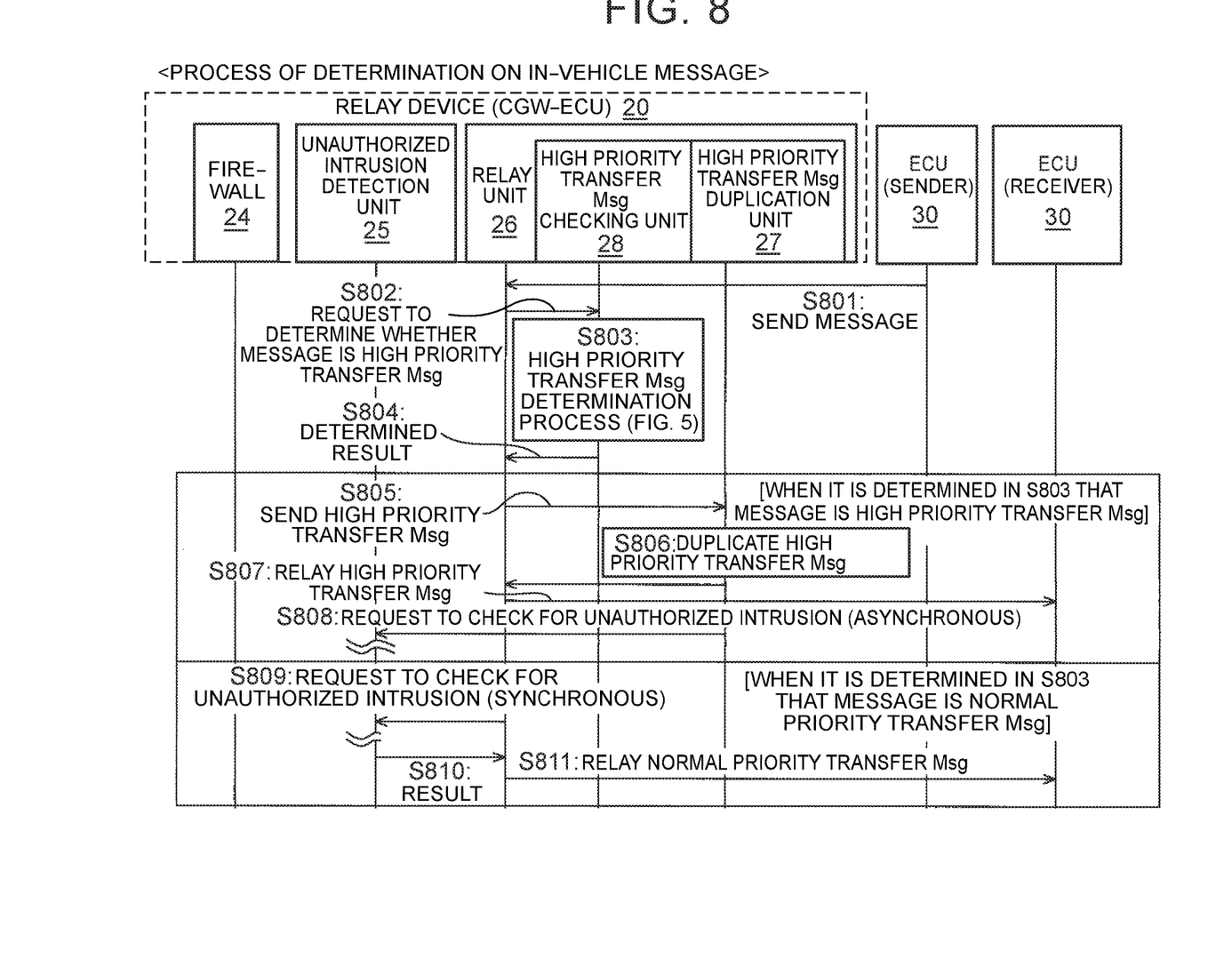
FIG. 8 is a process sequence in which the relay device relays an in-vehicle message that is received from any one of ECUs to another one of the ECUs.

A process of determining an in-vehicle message that is communicated between the ECUs 30 will be described with reference to FIG. 8. FIG. 8 is a process sequence in which the relay device 20 relays an in-vehicle message that is received from any one of the ECUs 30 to another one of the ECUs 30.

In executing the process of determination on an in-vehicle message, a new high priority transfer message checking unit 28 is added to the relay unit 26 in the configuration of the relay device 20 shown in FIG. 1 (not shown in the diagram). The function of the high priority transfer message checking unit 28 is the same as the function of the high priority transfer message checking unit 22. The process sequence shown in FIG. 8 is started when the relay device 20 receives a message from any one of the ECUs 30.

In step S801, the ECU (sender) 30 sends the message (Msg) to the relay unit 26. In step S802, the relay unit 26 requests to the high priority transfer message checking unit 28 to determine whether the message sent from the ECU (sender) 30 is a high priority transfer message (high priority transfer Msg). In step S803, the high priority transfer message checking unit 28 executes the high priority transfer message determination process (FIG. 5) in response to the request from the relay unit 26. In step S804, the high priority transfer message checking unit 28 sends back the result of the high priority transfer message determination process (FIG. 5) to the relay unit 26.

In step S805, when the high priority transfer message checking unit 28 determines that the message is a high priority transfer message, the relay unit 26 sends the high priority transfer message to the high priority transfer message duplication unit 27. In step S806, the high priority transfer message duplication unit 27 duplicates the high priority transfer message acquired from the relay unit 26. In step S807, the high priority transfer message duplication unit 27 sends any one of the high priority transfer message acquired from the relay unit 26 and the high priority transfer message duplicated by itself to the relay unit 26. The relay unit 26 sends the high priority transfer message acquired from the high priority transfer message duplication unit 27 to the ECU (receiver) 30. In step S808, the high priority transfer message duplication unit 27 sends the other one of the high priority transfer message acquired from the relay unit 26 and the high priority transfer message duplicated by itself to the unauthorized intrusion detection unit 25 and requests to check for an unauthorized intrusion. The following process of checking whether there is an unauthorized intrusion is executed in accordance with FIG. 3.

In step S809, when the high priority transfer message checking unit 28 determines that the message is a normal priority transfer message, the relay unit 26 sends the normal priority transfer message to the unauthorized intrusion detection unit 25 and requests to check for an unauthorized intrusion. The following process of checking whether there is an unauthorized intrusion is executed in accordance with FIG. 4. In step S810, when the unauthorized intrusion detection unit 25 determines that the normal priority transfer message is not an unauthorized message, the unauthorized intrusion detection unit 25 sends the detected result of the fact that there is no unauthorized intrusion to the relay unit 26. In step S811, the relay unit 26 sends the normal priority transfer message to the ECU (receiver) 30 according to the detected result.

With the processes of step S801 to step S811 of Application Example 1, for message communication directed from any one ECU (sender) of the ECUs 30 connected to the in-vehicle network to another one ECU (receiver) of the ECUs 30, as in the case of message communication directed from the external device to any one of the ECUs 30 connected to the in-vehicle network, as described in the embodiment, the relay device 20 is able to execute the process of relaying a message.

Application Example 2

Figure 9:
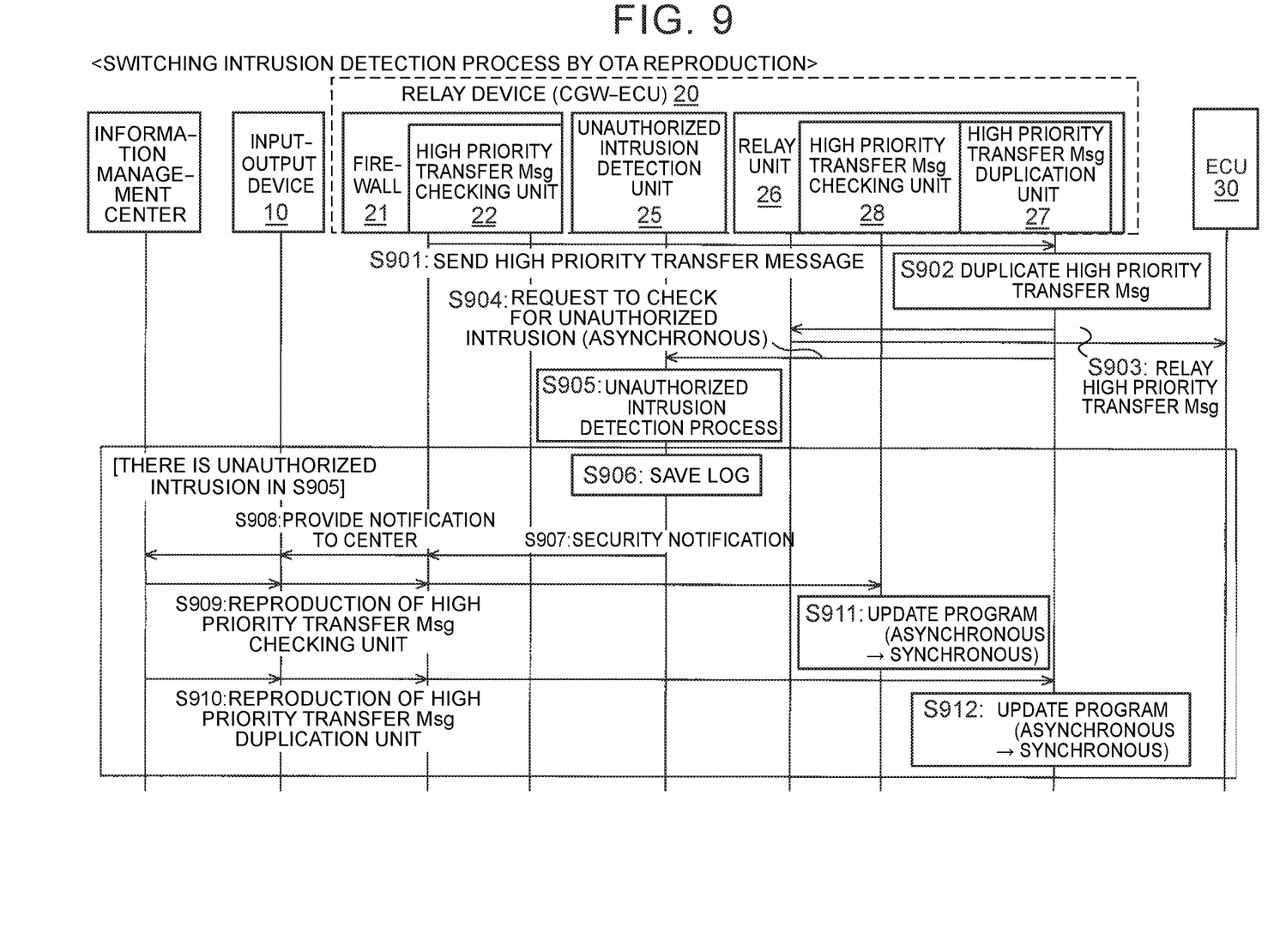
FIG. 9 is a process sequence in which the relay device receives an update program from an external device.

An OTA reproduction process in which, when the unauthorized intrusion detection unit 25 determines that there is an unauthorized intrusion of a high priority transfer message, programs of the high priority transfer message duplication unit 27 and high priority transfer message checking unit 28 of the relay unit 26 are updated from the external device will be described with reference to FIG. 9. FIG. 9 is a process sequence in which the relay device 20 receives an update program from the external device.

In step S901, the firewall 21 sends a high priority transfer message (high priority transfer Msg) input from the input-output device 10 or any one of the ECUs 30 and checked by the high priority transfer message checking unit 22 to the high priority transfer message duplication unit 27. In step S902, the high priority transfer message duplication unit 27 duplicates the high priority transfer message acquired from the firewall 21. In step S903, the high priority transfer message duplication unit 27 sends any one of the high priority transfer message acquired from the firewall 21 and the high priority transfer message duplicated by itself to the relay unit 26. The relay unit 26 sends the high priority transfer message acquired from the high priority transfer message duplication unit 27 to an intended one of the ECUs 30. In step S904, the high priority transfer message duplication unit 27 sends the other one of the high priority transfer message acquired from the firewall 21 and the high priority transfer message duplicated by itself to the unauthorized intrusion detection unit 25 and requests to check for an unauthorized intrusion. This request is made independently (asynchronously) of relay communication through the process of step S903. In step S905, the unauthorized intrusion detection unit 25 acquires the high priority transfer message based on the request from the high priority transfer message duplication unit 27 and detects an unauthorized intrusion by determining whether the acquired high priority transfer message is an unauthorized message.

In step S906, when the unauthorized intrusion detection unit 25 determines that the high priority transfer message is an unauthorized message, the unauthorized intrusion detection unit 25 saves a log of the fact that the unauthorized message has been relayed to the in-vehicle network. In step S907, the unauthorized intrusion detection unit 25 provides the firewall 21 with information on the high priority transfer message to enhance security against unauthorized messages. In step S908, the firewall 21 sends information on the high priority transfer message to the input-output device 10 to provide the information on the unauthorized message to the information management center that is the external device. The input-output device 10 sends the information on the high priority transfer message to the information management center. In step S909, the information management center sends an update program, which is able to run an unauthorized intrusion detection process over a high priority transfer message in the unauthorized intrusion detection unit 25 synchronously with a message, to the high priority transfer message checking unit 28 of the relay unit 26 via the input-output device 10 and the firewall 21. In step S910, the information management center sends the update program to the high priority transfer message duplication unit 27 of the relay unit 26 via the input-output device 10 and the firewall 21. In step S911, the high priority transfer message checking unit 28 updates its own program based on the received update program. In step S912, the high priority transfer message duplication unit 27 updates its own program based on the received update program.

With the processes of step S901 to step S912 of Application Example 2, when it is found that a high priority transfer message relayed to the in-vehicle network is an unauthorized message, a process in which reduction of a time that takes to relay (asynchronous process) a high priority transfer message has a higher priority can be changed to a process in which security (synchronous process) has a higher priority from the next time.

Operation and Advantageous Effects

As described above, with the relay device 20 according to the embodiment of the disclosure, the high priority transfer message checking unit 22 that checks whether an authorized message received by the firewall 21 is a high priority transfer message and the high priority transfer message duplication unit 27 that duplicates a high priority transfer message are provided. When the authorized message is a high priority transfer message, the relay device 20 relays one of the two high priority transfer messages duplicated by the high priority transfer message duplication unit 27 to the in-vehicle network and, at the same time, determines whether there is an unauthorized intrusion by using the other one of the high priority transfer messages. When the authorized message is a normal priority transfer message, the relay device 20 determines whether there is an unauthorized intrusion by using the received original normal priority transfer message and then, when there is no unauthorized intrusion, relays the normal priority transfer message to the in-vehicle network.

With this process, relaying a high priority transfer message to the in-vehicle network and checking a high priority transfer message for an unauthorized intrusion are executed in parallel with each other, so an increase in a delay time to relay a high priority transfer message is prevented. Checking a normal priority transfer message for an unauthorized intrusion is performed before relaying the normal priority transfer message to the in-vehicle network, so security has a higher priority.

With the relay device 20 according to the present embodiment, when an authorized message is a high priority transfer message, the high priority transfer message is sent to the high priority transfer message duplication unit 27, and the relay process is executed without saving the high priority transfer message in the saving unit 23; whereas, when an authorized message is a normal priority transfer message, the normal priority transfer message is saved in the saving unit 23, and the relay process is executed.

With this process, a high priority transfer message is relayed to the in-vehicle network without temporarily saving the high priority transfer message in the saving unit 23, so an increase in a delay time to relay a high priority transfer message is prevented. A normal priority transfer message is temporarily saved in the saving unit 23, whether there is an unauthorized intrusion is checked at predetermined timing, and then the normal priority transfer message is relayed to the in-vehicle network, so security has a higher priority.

With the relay device 20 according to the present embodiment, when a high priority transfer message is an unauthorized message, an intrusion of a new unauthorized high priority transfer message is prevented by the firewall 21, or a response message generated from an unauthorized high priority transfer message received from one of the ECUs 30 is discarded by the relay unit 26. With this process, spreading of damage due to an unauthorized high priority transfer message is prevented.

With the relay device 20 according to the present embodiment, when a normal priority transfer message is an unauthorized message, an intrusion of a new unauthorized normal priority transfer message is prevented by the firewall 21 or the normal priority transfer message saved in the saving unit 23 is discarded by the firewall 24. With this process, spreading of damage due to an unauthorized normal priority transfer message is prevented.

Modification 1

Figure 10:
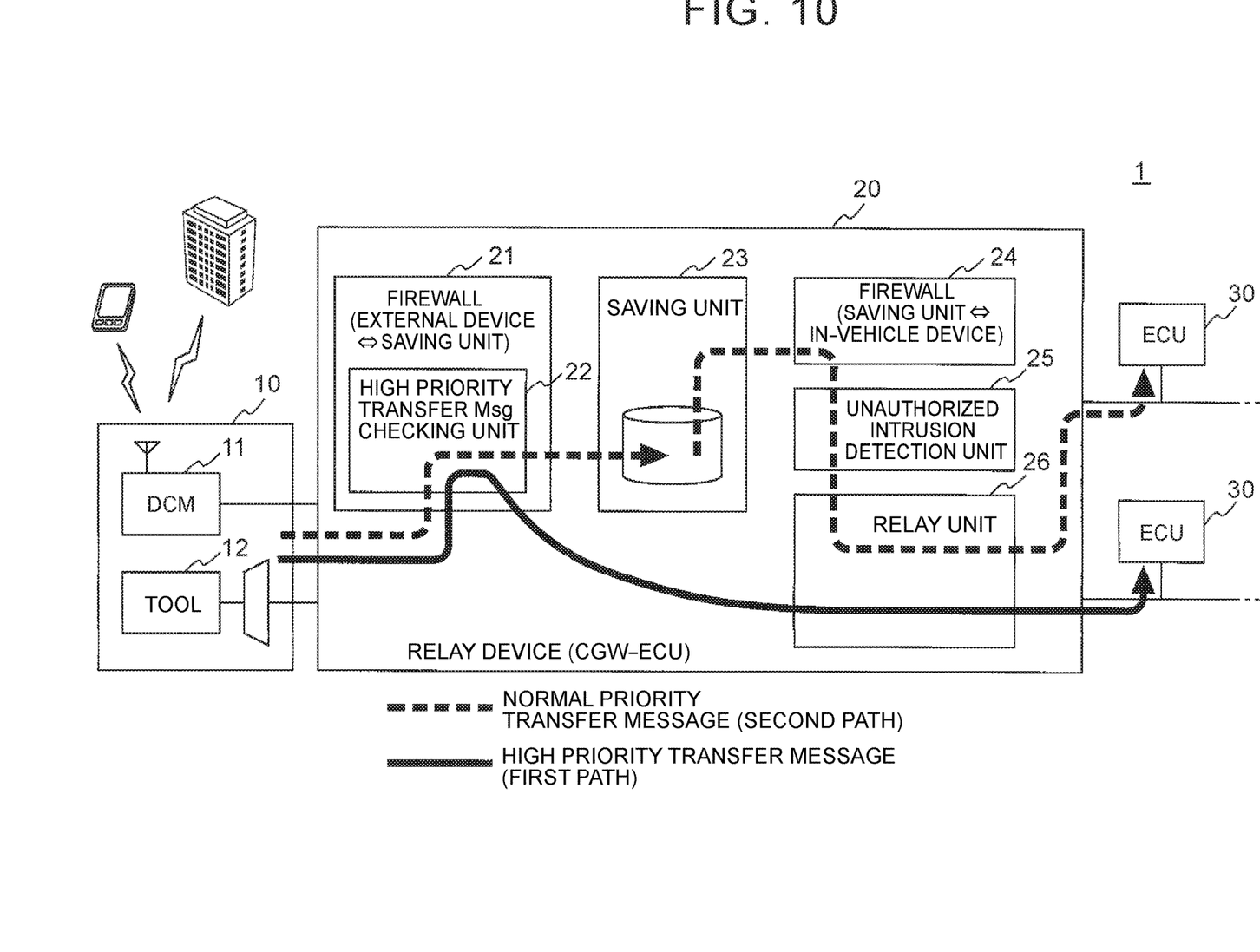
FIG. 10 is a diagram that shows a schematic configuration example of an in-vehicle communication system to which a relay device according to Modification 1 of the embodiment is applied.

In the above-described embodiment, the relay device 20 that has both the function of duplicating a high priority transfer message by the high priority transfer message duplication unit 27 and the function of temporarily saving a normal priority transfer message by the saving unit 23 is described. Alternatively, as in the case of Modification 1 shown in FIG. 10, the relay device 20 may be configured without the high priority transfer message duplication unit 27. With this configuration, the process of duplicating a high priority transfer message and the process of detecting an unauthorized intrusion for a high priority transfer message in the sequences of FIG. 3, FIG. 8, and FIG. 9 are omitted. With the configuration of Modification 1, whether a high priority transfer message is an unauthorized message cannot be determined; however, a relay process in which a relay time has a higher priority for a high priority transfer message and security has a higher priority for a normal priority transfer message can be executed.

Modification 2

Figure 11:
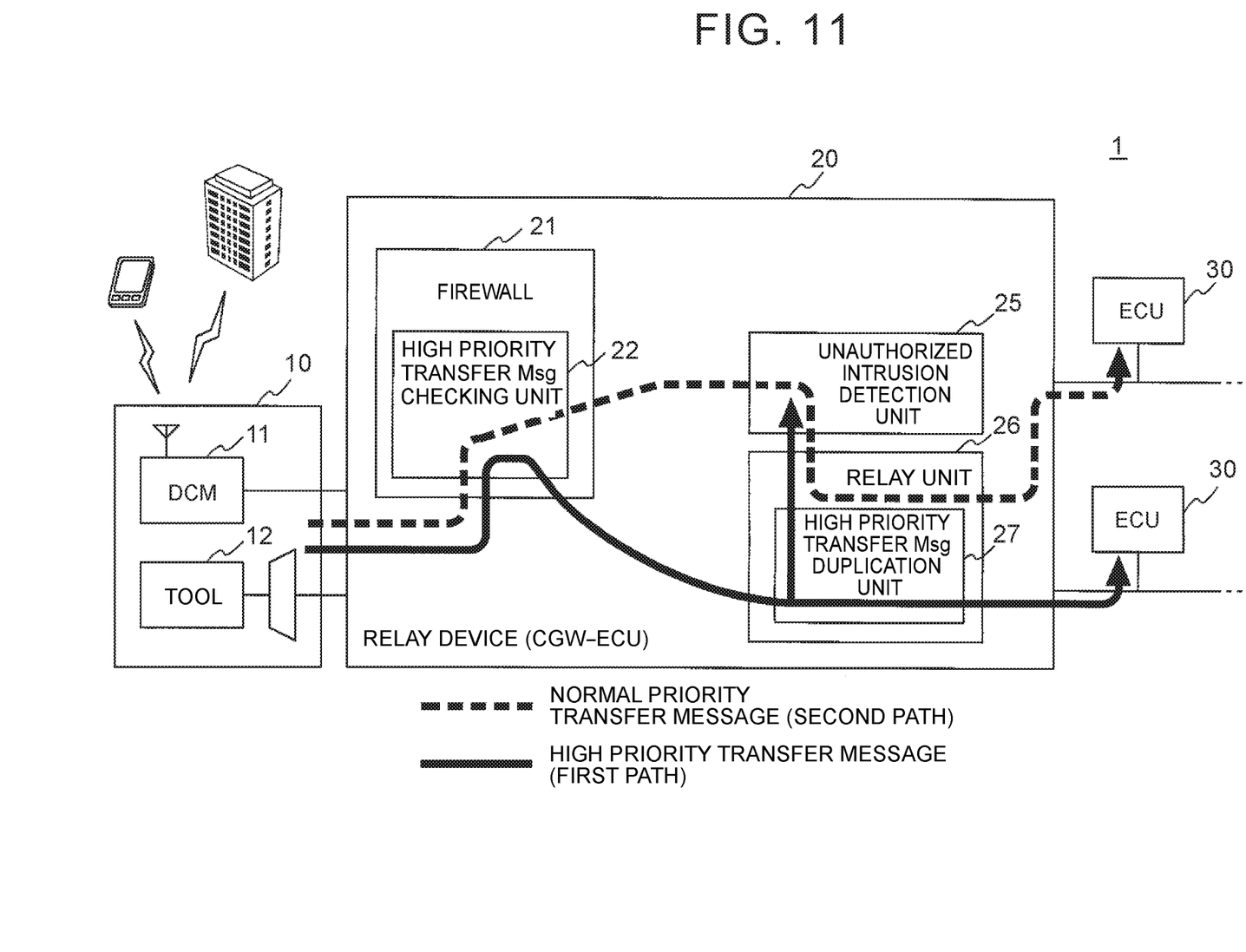
FIG. 11 is a diagram that shows a schematic configuration example of an in-vehicle communication system to which a relay device according to Modification 2 of the embodiment is applied.

As in the case of Modification 2 shown in FIG. 11, the relay device 20 may be configured without the saving unit 23 and the firewall 24. With this configuration, the process of saving a normal priority transfer message in the saving unit 23 and the process of checking whether a normal priority transfer message is authorized data by the firewall 24 in the sequence of FIG. 4 are omitted. With the configuration of Modification 2, double security using the saving unit 23 and the firewall 24 is not achieved; however, a relay process in which a relay time has a higher priority for a high priority transfer message and security has a higher priority for a normal priority transfer message can be executed.

The embodiment of the disclosure is described above; however, the disclosure may be interpreted as a relay device, an in-vehicle communication system including the relay device, a message relay method that the relay device executes, a message relay processing program, a non-transitory computer-readable storage medium storing the program, or a vehicle on which the relay device is mounted.

The relay device of the disclosure is usable in, for example, a vehicle on which an in-vehicle communication system that connects an external device and an in-vehicle device is mounted.

What is claimed is:

1. A relay device connected to an in-vehicle network, the relay device comprising:
   a first determination unit configured to determine whether a received message which is received from an external device is a high priority transfer message containing data that needs to be sent within a predetermined time to an in-vehicle device connected to the in-vehicle network;
   a second determination unit configured to determine whether the received message is an unauthorized message due to an unauthorized intrusion; and
   a relay processing unit configured to relay the received message to at least the in-vehicle device, wherein:
   the relay processing unit is configured to, when the first determination unit determines that the received message is the high priority transfer message, output the received message from the first determination unit to the in-vehicle device without passing through the second determination unit, and output a duplicate of the received message to the second determination unit;
   the relay processing unit is configured to, when the first determination unit determines that the received message is a normal priority transfer message different from the high priority transfer message,
   output the received message from the first determination unit to the in-vehicle device via the second determination unit; and
      the relay processing unit is configured to, when the first determination unit determines that the received message is the high priority transfer message and the second determination unit determines that the duplicate of the received message is an unauthorized message, discard a response message that is received from the in-vehicle device as a response to the received message.

2. The relay device according to claim 1, further comprising:
   a saving unit, the saving unit being configured to temporarily save the normal priority transfer message; and
   a third determination unit, the third determination unit being configured to acquire the normal priority transfer message and determine whether the acquired normal priority transfer message is an authorized message that satisfies a predetermined condition, wherein:
   the third determination unit is configured to read the normal priority transfer message from the saving unit at predetermining timing; and
   the third determination unit is configured to, when the read normal priority transfer message is the authorized message, output the normal priority transfer message to the second determination unit.

3. The relay device according to claim 2, wherein the third determination unit is configured to, when the second determination unit determines that the normal priority transfer message is the unauthorized message, discard the normal priority transfer message.

4. The relay device according to claim 1, wherein the second determination unit is configured to, when the second determination unit determines that at least one of the high priority transfer message and the normal priority transfer message is the unauthorized message, provide the first determination unit with notification that the at least one of the high priority transfer message and the normal priority transfer message is the unauthorized message.

5. A relay device connected to an in-vehicle network, the relay device comprising:
a processor programmed to:
determine whether a received message which is received from an external device is a high priority transfer message containing data that needs to be sent within a predetermined time to an in-vehicle device connected to the in-vehicle network;
determine whether the received message is an unauthorized message due to an unauthorized intrusion; and
relay the received message to at least the in-vehicle device, wherein:
when the processor determines that the received message is the high priority transfer message, output the received message to the in-vehicle device without determining whether the received message is the unauthorized message due to the unauthorized intrusion, and determine whether a duplicate of the received message is the unauthorized message due to the unauthorized intrusion;
when the processor determines that the received message is a normal priority transfer message different from the high priority transfer message, output the received message to the in-vehicle device after determining whether the received message is the unauthorized message due to the unauthorized intrusion; and
when the processor determines that the received message is the high priority transfer message and the processor determines that the duplicate of the received message is an unauthorized message, discard a response message that is received from the in-vehicle device as a response to the received message.

6. The relay device according to claim 5, wherein the processor is further programmed to:
temporarily save the normal priority transfer message in a storage;
determine whether the normal priority transfer message is an authorized message that satisfies a predetermined condition;
read the normal priority transfer message from the storage at predetermining timing; and
when the read normal priority transfer message is the authorized message, determine whether the normal priority transfer message is the unauthorized message due to the unauthorized intrusion.

7. The relay device according to claim 6, wherein the processor is further programmed to, when determining that that the normal priority transfer message is the unauthorized message due to the unauthorized intrusion, discard the normal priority transfer message.

8. The relay device according to claim 5, wherein the processor is further programmed to, when determining that at least one of the high priority transfer message and the normal priority transfer message is the unauthorized message, generate a notification that the at least one of the high priority transfer message and the normal priority transfer message is the unauthorized message.

\* \* \* \* \*